United States Patent
Frohn et al.

(10) Patent No.: US 6,246,476 B1
(45) Date of Patent: Jun. 12, 2001

(54) METHOD AND APPARATUS FOR CONTROLLING A MOVEABLE OBJECT

(75) Inventors: Heiko Frohn, Eppstein/Ts; Norbert Lehn, Taunusstein, both of (DE)

(73) Assignee: Vitronic Dr.-Ing. Stein, Wiesbaden (DE)

( * ) Notice: Subject to any disclaimer, the term of this patent is extended or adjusted under 35 U.S.C. 154(b) by 0 days.

(21) Appl. No.: 09/281,721

(22) Filed: Mar. 30, 1999

(30) Foreign Application Priority Data

Apr. 2, 1998 (DE) ............................. 198 14 779

(51) Int. Cl.$^7$ .................................................. G01B 11/14
(52) U.S. Cl. ................................................. 356/375; 364/513
(58) Field of Search ...................... 356/375, 373; 364/513, 424–422, 181, 424.07; 187/9 R; 414/633

(56) References Cited

U.S. PATENT DOCUMENTS

| | | | |
|---|---|---|---|
| 4,279,328 | * 7/1981 | Ahlbom | 187/9 R |
| 4,877,325 | * 10/1989 | Weule et al. | 356/375 |
| 4,998,209 | * 3/1991 | Vuichard et al. | 364/513 |
| 5,208,753 | * 5/1993 | Acuff | 364/424.07 |
| 5,319,443 | * 6/1994 | Watanabe et al. | 356/375 |

FOREIGN PATENT DOCUMENTS

| | | | |
|---|---|---|---|
| 3443340 | 5/1986 | (DE) | B25J/9/16 |
| 3635076 | 4/1988 | (DE) | B25J/9/18 |
| 4219042 | 10/1993 | (DE) | B25J/15/04 |
| 4330845 | 12/1994 | (DE) | G05D/3/20 |
| 19534963 | 12/1996 | (DE) | B25J/19/04 |
| 19543048 | 8/1997 | (DE) | F41G/7/22 |
| 19613516 | 10/1997 | (DE) | B25J/15/06 |

OTHER PUBLICATIONS

Elsbeth Heinzelmann, "Lernende Roboter dank neuronaler Technick," Technische Rundschau, Heft 25/26, pp. 52–57 (1993).

Joachim Milberg et al., "Sensorsysteme für die Montage," Montage– und Handhabungtechnik, Industrieroboter, pp. 100–104 (1987).

Gerhard Nehr et al., "Die Kopplung eines Werkstückerkennungssystems mit einem Industrieroboter," VDI–Z 124, Nr. 10, pp. 375–381 (1982).

Lee E. Weiss et al., "Dynamic Sensor–Based Control of Robots with Visual Feedback," IEEE Journal of Robotics and Automation, vol. RA–3, No. 5, pp. 404–417 (1987).

Gerd Hirzinger et al., "Sensor–Based Space Robotics—ROTEX and Its Telerobotic Features," IEEE Transactions on Robotics and Automation, vol. 9, No. 5 (1993).

M. Jamshidi, "Sensors and Interfacing in Robotics and Manufacturing," Robotics & Computer–Integrated Manufacturing, vol. 7, No. 3/4, pp. 243–253 (1990).

Ulrich Rembold et al., "Sensoren für fortschrittliche Handhabungssysteme," Technische Rundschau, No. 35/85, pp. 132–139 (1985).

G. Hartmann et al., "Ein distanz– und orientierungsinvariantes lernfähiges Erkennungssystem für Robotikanwendunge," Mustererkennung 1993, pp. 375–382 (1993).

\* cited by examiner

*Primary Examiner*—Robert H. Kim
*Assistant Examiner*—Cang H. Nguyen
(74) *Attorney, Agent, or Firm*—Baker & Maxham

(57) ABSTRACT

A method and apparatus for controlling a moveable object relative to another object employing an optical sensing system and pattern or structure recognition. Also included is apparatus for controlling the movement of one object with respect to the other, having drive and control elements for at least one of the objects. The movement controlling apparatus has a pattern memory device and a pattern recognition device.

23 Claims, 1 Drawing Sheet

METHOD AND APPARATUS FOR CONTROLLING A MOVEABLE OBJECT

BACKGROUND OF THE INVENTION

1. Field of the Invention

The present invention relates to a method for controlling the movement of a moveable first object relative to a second object, and namely with the aid of optical sensing of the second object or a part thereof by means of an optical sensing system, with recognition of a pre-determined pattern and/or a structure present on the second object, wherein corresponding structures are stored in a memory device, and wherein the first and the second objects are approached from a position in which they are spaced apart into engagement with one another.

The present invention also relates to an apparatus for controlling the movement of a moveable first object relative to a second object, with drive and control devices for at least one of the objects, a pattern memory device and a pattern recognition device, and an optical sensing device for patterns and/or structures selected for or applied to the second object.

2. Discussion of Related Art

Corresponding methods and apparatus are known from so-called robotics and robot technology. With the method and the apparatus from which the present invention proceeds, for example, a tool fitted on the end of a robot arm must engage with an object, which itself can be moveable, so its position is not exactly defined from the outset but must first be sensed by an optical sensing device in order to bring the robot arm and the tool fitted onto it into engagement with the second object concerned in a well-directed manner. The fact that the position of the second object with which the first object or part of the first object has to be brought into engagement is not defined from the outset, differentiates such methods and apparatus, for example, from other automated machines such as, for example, machine tools with tool changing devices in which different tools are arranged in a tool magazine at precisely defined positions, so an automatic tool change can take place without the respective tools having to be optically sensed.

With other methods and apparatus, for example, a tool, a reading head or another device is continuously passed at a substantially fixed distance above the surface or parts of the surface of a second object. Here too, parts of the first object can be in engagement with parts of the second object. However it is not the procedure of bringing the first object closer to the second object which is controlled, but simply the movement of the parts engaged with one another relative to one another, for example, the movement of a welding device along a welding path, wherein the seam site of the parts to be welded together is optically sensed and continuously followed. During this movement control, no approaching takes place, but instead the distance is kept constant with the aid of an appropriate feed-back control system.

SUMMARY OF THE INVENTION

With the methods and apparatus from which the present invention proceeds, a two-stage movement is usual, for example, wherein first, in accordance with a predetermined movement program, a first approaching movement takes place which brings the first object or the parts to be brought into engagement with one another, into a roughly estimated close proximity, in which, however, because of the circumstances and the boundary conditions, such as for example the ranges of movement of the two objects, coming into contact is still excluded for the time being. An optical position measurement of the parts to be brought into engagement is then carried out, and the remainder of the movement done under the control of the drive device of the first object according to the coordinates sensed in the previous position. During this last portion of the movement, however, there is no longer any control and correction of the movement. The latter can be a problem above all where unexpected further movements of the second object are possible, or when the second object carries on moving, in particular, when it does not move at a regular speed. While smooth movements of the second object can be taken into account with the conventional method and the corresponding apparatus, it is no longer possible with unexpected, unpredictable or irregular movements of the second object relative to the first object. The setting of the preliminary position in which the two objects are first brought roughly close together is only useful and possible without problems when the movement range of the second object relative to the first one is limited during the approaching movement, that is to say, when it is definite that the second object or those parts of the second object which have to be brought into engagement with parts of the first object is located within a relatively small, predetermined space.

These criteria cannot always be satisfied in practice, however. For example, with advancing automation, there is a need for an automatic refuelling system, in which a driver drives his car into the area in front of an automatic fuel pump and, for example, opens the filler flap from inside, whereupon a fuel hose is automatically conveyed to the fuel tank inlet and is coupled with the fuel tank inlet, and then filling up of the vehicle can take place automatically. Such a system is very pleasant for the customer, as he need not wait for service personnel, nor worry about soiling his hands with fuel or oil as often happens when touching conventional fuel pump nozzles at filling stations. A fuel station of this type could save on personnel and thus on costs with such a system. There is nevertheless a problem that the driver cannot always drive his vehicle exactly into a predetermined position, but instead the position which he has to occupy during refuelling can only be very roughly predetermined as it would not be possible for most drivers to position their vehicle exactly to the centimeter. Moreover, the fuel tank inlets are at different heights on different vehicles, and also fitted at different distances from the front or rear part of the vehicle, so even an appropriate control and positioning for the driver, as is known, for example, from car washes, would only make a very rough positioning of the fuel tank inlet possible. Even with a special setting for a particular type of vehicle, these positions could vary due to different loading conditions of the vehicle. Lastly, the position of the fuel tank inlet can also change when the approach procedure has already started because of rolling movements due to the design of the vehicle.

It is clear that the present invention is not primarily directed towards automatic refuelling systems, but instead that this example has simply been presented here for the purpose of making the problems occurring with many approach procedures clearly understandable, when the second object remains moveable relative to the first object, and/or cannot be exactly positioned.

Compared to the prior art described herein above, the object of the present invention is to provide a method and apparatus with the features described in the introduction, which make possible a secure engagement of the parts of the first and second objects to be brought into engagement with one another, even when the second object can perform more or less uncontrollable movements with respect to the first object during the approach movement, and/or when the position which the second object can take up can only be very roughly established. It is clear that the parts of the second object which are to be brought into contact with the parts of the first object must nevertheless always lie within the range of movement or within reach of the latter.

With respect to the method described in the introduction, the object of the invention is solved in that the approach of the first object to the second is done with continuous sensing of the structures of the second object by the sensing device of the first object, wherein the distance between the parts of the first and second objects to be brought into engagement with one another are continuously sensed, either directly or indirectly, and wherein the movement control takes place dependent upon the currently sensed distance and dependent upon the currently established deviation from the desired path of approach.

The substantial difference to the known methods is thus in that the movement control is continuously controlled until final docking of the first object with the second and corrections are still possible at any time, even when the second object moves somewhat with respect to the first object, when the first object has almost reached the second.

The corresponding apparatus is characterised in that it is provided with devices for continuous direct or indirect sensing of the distance between the parts of the first and second objects to be brought into mutual engagement, and devices for controlling the approach movement dependent upon the currently sensed distance, and dependent upon the currently established deviation from the desired path of approach.

The corresponding control devices can, for example, control the device so that the approach movement is slowed down as the distance decreases, so that sufficient time remains for corrections transverse to the approach movement, and so that the engagement between the parts to be brought into engagement takes place sufficiently gently, while at greater distances the relative movement can take place very rapidly and with less accuracy.

The moveable first object on which optical sensing devices are fitted records the structures fitted or present on the second object by means of its optical system. Structures selected specifically for the movement control of the first object and fitted on the second object, the concrete configuration and shape of which is specifically designed for the requirements of the approach movement, are generally preferable. Such a pattern or an appropriate structure could, for example, be composed of two beams arranged at right-angles in an L-shape, or of three points which reflect the corner points of a triangle, preferably a not equilateral and right-angled triangle. The particular structure which is optimal for a given application depends upon whether this approach movement has also to take place with a specific orientation of the two objects to one another, or whether this orientation is not relevant. In the latter case, an approach structure can, for example, be composed of a simple ring or of a plurality of concentric rings. If the approach can take place in different, precisely defined rotating positions, an appropriate polygon, or points which define the corners of such a polygon, can be applied as structures to the second object. The capacity for optical sensing of the structures must also be taken into account, preferably such structures could, for example, be fitted onto a reflective foil which is adhesively bonded onto an appropriate place on the second object.

The apparatus is additionally provided with scaling devices for matching the size of the pattern or structures sensed to the stored structures, or vice-versa. The corresponding method undertakes this size matching of the structure sensed. The optical sensing device fitted on the first object approaches the second object simultaneously with the approaching movement of the first object towards the second object so the image section of this optical sensing device also changes continuously and, in particular, the size and possibly also the orientation of the structure or pattern fitted to the second object. Since it is important for the approach procedure that the structure which is to serve as an orientation aid for the approach of the first object towards the second is recognised as such, and since this is done by comparison with corresponding stored patterns, it is also advantageous and useful to perform a matching between the stored and the sensed structure because of the varying image section and the resultant change in the size of the structure. Within the framework of the present patent application, a stored "pattern" or stored "structure" are not only patterns in the form of graphic data but also patterns or structures defined abstractly by numerical data, wherein it is simply a question of configuration of suitable programs, comparisons and recognition sequences as to how far graphic data are to be directly compared or whether initially graphic data are converted into more abstract, numerical data, or vice-versa, wherein different image processing techniques such as contrast enhancement, alterations to the grey scale and so forth can also be involved.

In practice this can be done, for example, by zoom optics which continuously match the image section and the focal length of an objective of the optical sensing device such that the pattern substantially always occupies the same image section. However, a purely computed matching of the sizes of the structures and patterns is to be preferred. Parameters for matching, that is to say either the concrete positioning of the zoom optics or the scaling factors between optical structures and stored structures, can be used as indirect scales for the distance reached of the parts of the first and second objects to be brought into engagement with one another. It is clear that the distance between the parts described sensed indirectly in the f6rm of the scaling factors could at any time be converted into a direct scale of distance, although this is not necessary for the control of the device as the indirect sizes which definitely establish the distance are also useable.

It is clear that there are alternative methods to the scaling procedure such as, for example, the storing of patterns of different sizes and the matching of the optically sensed pattern to one of the respective stored patterns, wherein matching to the best matching pattern their provides a measurement for the distance reached. Such alternatives are also scaling and size matching between the optically sensed and stored patterns.

An embodiment of the invention is particularly preferred wherein the optical sensing device senses the second object and respectively the structures present upon it from a part of the first object coming into contact with the second object. In concrete terms, appropriate camera optics are integrated into a part of the first object which comes into engagement with the second -object. With this, the camera optics or respectively an objective can be integrated into a cavity of the part concerned of the first object. The entire camera can be contained in a cavity in the first object, wherein a configuration of the invention is nevertheless preferred in which the objective, with its surface closest to the second object, is at a relatively large distance away from the actual camera of the optical sensing device. This distance can, for example, with a rigid optical system, be in a range of 10 to 50 cm or even more. An optical system would also possibly be conceivable which conveys the image generated by the objective via mirrors or via an ordered bundle of optical fibres to a relatively distant camera. There is firstly the advantage that the movement control, and the sensing of the parameters important for the movement control is done precisely from the part which also actually implements the approach towards the second object and comes into engagement with it. Any shading or obscuring effects which could occur with stationary or also with moveable cameras fitted outside the first object are avoided. The arrangement of only the camera optics in the frontmost area of the part of the first object coming into engagement with the second object limits to the absolute minimum necessary the arrangement of parts which do not serve the other function of the parts coming into engagement with one another. These parts can then, for their part, have a minimal size.

A further advantage of the camera arranged more or less distant from the objective is in that such a camera generally contains an electrical power supply and for many applications it is advantageous to keep such power supplies away from the area of engagement of the parts of first and second objects. As a purely passive, optical component, the camera optics are then non-critical.

In the preferred embodiment, the same also applies to the lighting, which if possible should also be integrated in the part of the first object which comes into engagement with the second object. The lighting integrated in this way ensures optimum illumination of the structures to be sensed by the optical sensing device. The lighting device is also configured, in the preferred embodiment of the invention, such that no electrical charges, sparks or other sources of danger can be present in the area of engagement of the first and the second objects, in that a lighting device composed of light conducting fibres is used, wherein the light conducting fibres are connected to a light source at their end lying away from the area of engagement. Advantageously, the light conducting or optical fibres are respectively connected individually to an appropriate light source, so local concentrations of light and thus of energy cannot occur between the light conducting fibres, and so that at the front end of the light conducting fibres the light exits with a uniformly distributed light density.

It is clear that according to the configuration of the parts coming into engagement with one another, the optical sensing device and/or the camera optics and the lighting devices, can be arranged more or less centrally or eccentrically in that part of the first object which comes into engagement with the second object.

In particular for the close range of the approach, a wide-angle objective is advantageously provided for the optical sensing device.

BRIEF DESCRIPTION OF THE DRAWING

Further advantages, features and possibilities for application of the present invention will be clarified with reference to the following description of a preferred embodiment and the associated Figures. In these is shown, in.

Figure 1:
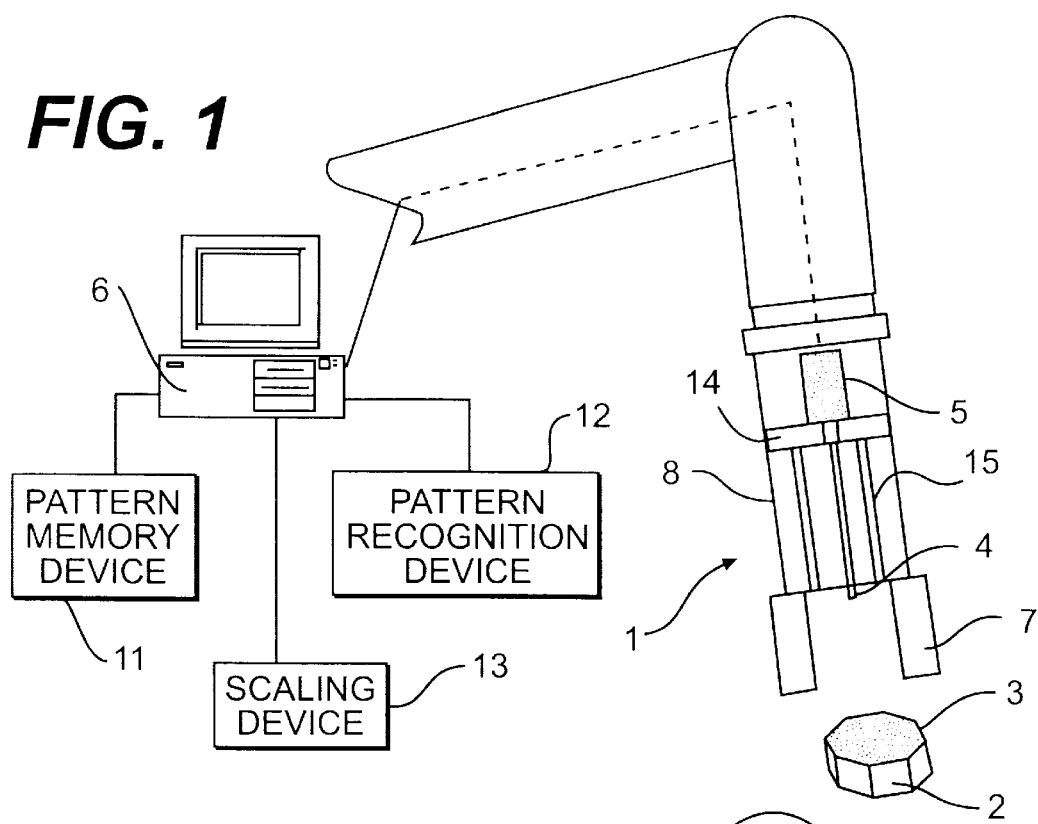
FIG. 1 a first variant of the apparatus according to the invention with a central arrangement of the optical sensing apparatus, and FIG. 2 an embodiment with an eccentric arrangement of the optical sensing device.

A moveable robot arm 1 is shown in FIG. 1, on the front end of which a sleeve 8 is fitted, which in turn carries a tool 7 which is designed for engaging with a second object 2. The object 2, which is simply represented schematically here, and is representative of any object, in particular an object of any size and any complexity, is in the present case a regular eight-sided prism, the edges of which, forming an eight-sided polygonal feature, represent a structure 3 which is easily sensed optically. Object 2 has a structure or pattern which may be termed "predetermined characteristics." The tool 7 can be opposing gripper claws, but the tool 7 can also be a hollow part, which is provided with an inside surface arranged as a eight-sided polygonal feature matching the object 2. A camera 5 with camera optics 4 is contained in a cavity in the sleeve 8, wherein the camera optics 4 image the eight-sided structure 3 and project it onto appropriate light sensitive surfaces of the camera 5. The light sensitive surface of the camera 5 is generally a matrix of light sensitive part sections or pixels, as are used, for example, in video cameras, wherein other light sensitive surfaces and recording media can nevertheless also be used. Optics 4, as shown, can be a bundle of optical fibers, or the optics could be comprised of an appropriate mirror system.

The image signal received by the camera is electronically converted and supplied to a control unit 6 which in general contains a micro-processor and a memory device 11. The images received by the camera 5 are evaluated in the control unit 6 and temporarily stored. Pattern or structure recognition by means of a pattern recognition device 12 in control unit 6 is important in particular for the evaluation, in general, by comparison with a stored pattern or a stored structure in the memory device. The camera can be configured with zoom optics which continuously match the image section and the focal length of an objective of the optical sensing device such that the pattern substantially always occupies the same image section. However, a purely computed matching of the sizes of the structure and patterns in a control unit is preferred. The evaluating unit moreover also contains a scaling device 13 which, prior to the comparison, makes it possible to match the size of the structure 3, 3' sensed, for example, the mutual distance between two or three specific points of the structure 3' to the size of the stored structure, in order to arrive at a positive pattern recognition.

The camera optics 4 are arranged centrally in the sleeve and the tool 7, so that the controlled movement of the robot arm 1 can take place such that the camera optics 4 are orientated towards the centre of the polygonal feature 3 which it has sensed, and the movement takes place such that the polygonal feature remains arranged concentrically with respect to a target of the movement. The image sensed by the optical system 4 and the camera 5 is continuously reevaluated until the entire approach procedure can been completed and the engagement between the tool 7 and the object 2 has taken place or until the predetermined final position is reached and the tool 7 can be actuated in order to take hold of the object 2. To enable the sensing function of the camera to operate efficiently, some means for lighting target object 2 may optionally be employed. Light source 14 may be incorporated with camera 5, and light conducting fibers 15 extend therefrom toward the distal end of the sleeve 8. There may be many fibers 15 and they are arranged to provide uniform distributed light density in the area of interest where target object 2 resides.

Figure 2:
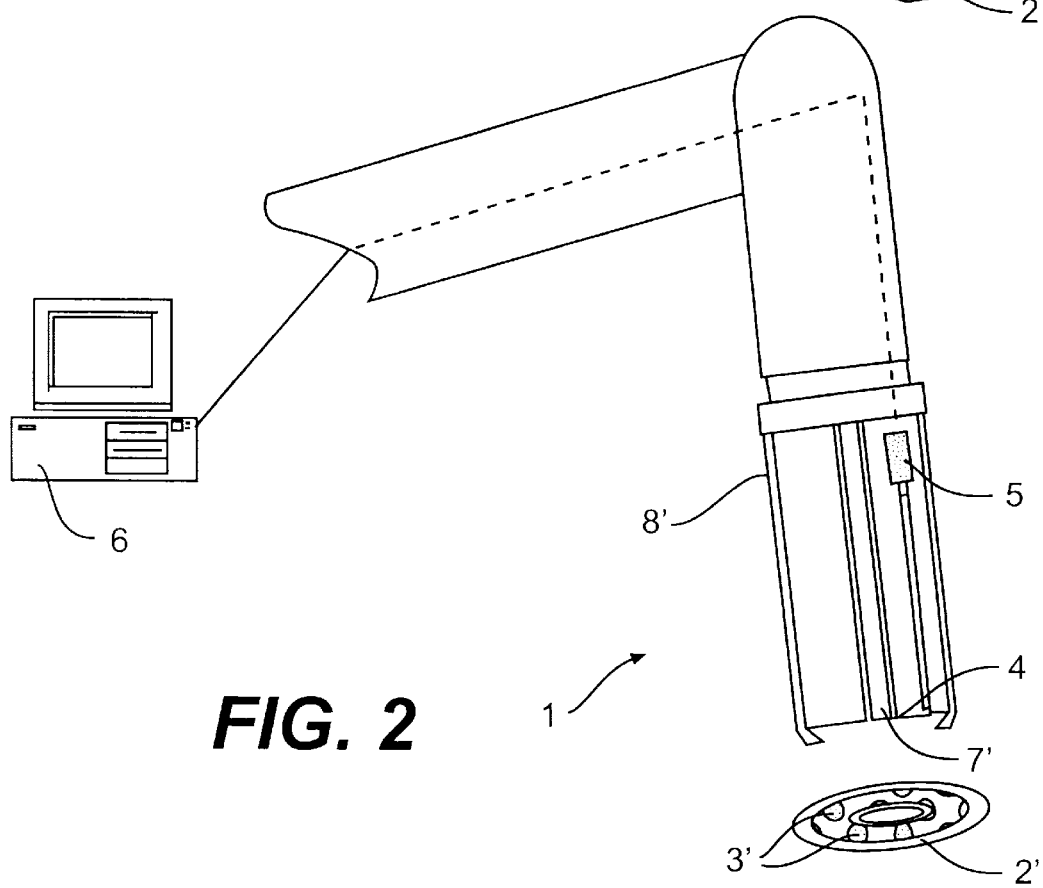

A very similar arrangement is shown in FIG. 2, in which the robot arm 1 is equipped with a fuel pipe 7' of an automatic fuel filling device instead of a tool 7. Accordingly, the object 2' is a fuel tank inlet, for example, the fuel tank inlet of a vehicle. Concentrically around the central aperture of the fuel tank inlet 2' there are arranged structural elements 3' which are sensed by the camera optics 4. In a concrete instance, the sleeve 8' of the fuel pipe 7' is arranged centrally, and the camera 5 and the camera optics 4 are arranged eccentrically with respect to it. The front end of the sleeve 8' can be composed of individual fingers or coupling elements which come into engagement with corresponding cut-outs or opposite coupling pieces on the fuel tank inlet 2'. In this case too, during the entire procedure of bringing the robot arm 1 close to the fuel tank inlet 2', the camera optics 4 have a clear view of the fuel tank inlet 2' and of the structural elements 3' arranged on it. Pattern recognition of the structural elements 3' takes place in a manner completely analogous to the pattern recognition in the case of the polygonal feature 3 in the embodiment according to FIG. 1. The control of the robot arm 1 in this case is, however, not such that the front end of the camera is guided into the centre of the pattern 3', but instead such that the camera optics 4 approaches the points of the pattern 3' from which the position of the entire structural plane of the pattern points 3', which, for example, span an equilateral triangle, can be deduced. Here also, during the approach procedure, constant scaling takes place, and the necessary scaling factor simultaneously represents, at known distances apart of the pattern points 3', and respectively with generally known measurements of the structural elements 3 and 3', a measure for the distance actually obtained between the tool 7 and the object 2, and respectively between the filler pipe 7' and the fuel tank inlet 2'. It is to be understood that the fuel tank inlet 2' could project by a greater or less amount above the front end of the camera optics 4 and also the sleeve 8', and the front coupling elements or fingers 8' of the sleeve, and also the camera optics can be withdrawn into suitable cavities provided on the fuel tank inlet 2' while the fuel pipe 7' is inserted into the central aperture or a central pipe of the fuel tank inlet 2'.

The relatively large gap shown intentionally in the drawings between the objective 4 of the camera optics and the electrical or electronic recording area in the actual camera 5 serves the purpose, in the embodiments presently shown, of keeping all current or voltage conducting parts at as great a distance as possible from the working area of the tools 7 and 7' and the second object 2 and 2'. This distance can, for example, be in the range of 10 cm to at least 50 cm. Mirrors or optical fibers can provide the distance from the actual camera to the work area or tools. It is preferred that the distance be at least 20 cm. In the case of the filler pipe 7', this is above all for the purpose of complying with the relevant explosion protection regulations. It is to be understood that the camera 5 can furthermore be separated from the working area by additional means, for example, by sealing or shielding screens which extend over the inside cross-section of the sleeves 8 and 8' and which include through-holes for the camera optics to be passed through and optionally also tools such as the filler pipe 7' or other control and actuating devices.

What is claimed is:

1. A method for controlling the movement of a moveable first object relative to a second object having predetermined characteristics, to enable a part of the first object to engage a part of the second object, the method employing an optical sensing system to sense the predetermined characteristics of the second object, the method comprising the steps of:

storing the predetermined characteristics of the second object in a memory device;

moving one of the first object and the second object with respect to the other from a mutually spaced apart position into engagement with one another employing the steps of:

continuously sensing the predetermined characteristics of the second object by the optical sensing system of the first object;

comparing the predetermined characteristics in memory with the sensed predetermined characteristics;

sensing a distance between the parts to be engaged of the first object and the second object;

sensing the direction from the first object to the second object;

calculating a desired path of approach between the first and second objects; and controlling the relative movements between the first and the second objects in relation to a current distance between those objects and an established deviation from the desired path of approach.

2. The method according to claim 1, wherein during the approach of the first object and the second object, size matching between the predetermined characteristics sensed by the optical sensing device and that stored in the memory device is undertaken.

3. The method according to claim 2, wherein the matching is done optically by means of zoom optics.

4. The method according to claim 2, wherein the size matching is done computationally.

5. Apparatus for controlling the movement of a moveable first object relative to a second object having predetermined characteristics, to enable a part of the first object to engage a part of the second object, the apparatus comprising:

a memory device incorporating a pattern recognition device having a memory in which are stored the predetermined characteristics of the second device;

an optical sensing device comprising camera optics integrated into said first object for sensing the predetermined characteristics of the second object;

means for comparing the predetermined characteristics stored in memory with the characteristics sensed by the optical sensing device;

means for sensing a distance between the mutual engaging parts of the first object and the second object;

means for sensing the direction from the first object to the second object;

means for calculating a desired path of approach between the first and second objects; and means for controlling the relative motion between the first and second objects, the relative motion depending upon a currently sensed distance and a currently established deviation from the desired path of approach.

6. The apparatus according to claim 5, and further comprising a scaling device for matching the size of the characteristics sensed to the stored predetermined characteristics.

7. The apparatus according to claim 6, wherein the scaling device is provided with zoom optics.

8. The apparatus according to claim 6, wherein the scaling device is part of the pattern recognition device.

9. The apparatus according to any one of claims 5 and 6 to 8, and further comprising a lighting device in the cavity.

10. The apparatus according to claim 9, wherein the lighting device comprises light conducting fibres connected at one end to a light source which is remote from the parts of the first and second objects to be brought into engagement.

11. The apparatus according to claim 10, and further comprising a camera, wherein an objective of the camera optics has a distance of at least 10 cm to the camera.

12. The apparatus according to claim 10, wherein the objective distance of the camera optics is at least 20 cm to the camera.

13. The apparatus according to any one of claims 5 and 6 to 8 and further comprising a camera, wherein an objective of the camera optics has a distance of at least 10 cm to the camera.

14. The apparatus according to any one of claims 5 and 6 to 8, wherein the optical sensing device is provided with a wide-angle objective.

15. The apparatus according to any one of claims 5 or 6 to 8, wherein the objective distance of the camera optics is at least 20 cm to the camera.

16. The apparatus according to claim 5, wherein the part of the first object that comes into engagement with the second object is formed with a cavity.

17. The apparatus according to claim 16, wherein the camera optics are received in the cavity.

18. The apparatus according to claim 17, and further comprising a camera, wherein the camera is received in the cavity.

19. The apparatus according to claim 11, and further comprising a lighting device in the cavity.

20. The apparatus according to claim 11, wherein the optical sensing device is provided with a wide-angle objective.

21. The apparatus according to claim 16, and further comprising a camera, wherein the camera is received in the cavity.

22. The apparatus according to claim 21, and further comprising a lighting device in the cavity.

23. The apparatus according to claim 21, wherein the optical sensing device is provided with a wide-angle objective.

* * * * *